US011649046B2

(12) United States Patent
Holly et al.

(10) Patent No.: US 11,649,046 B2
(45) Date of Patent: May 16, 2023

(54) GANGED SERVO FLIGHT CONTROL SYSTEM FOR AN UNMANNED AERIAL VEHICLE

(71) Applicant: AEROVIRONMENT, INC., Simi Valley, CA (US)

(72) Inventors: Lance Holly, Lawrence, KS (US); William Donovan, Lawrence, KS (US)

(73) Assignee: AEROVIRONMENT, INC., Arlington, VA (US)

( * ) Notice: Subject to any disclaimer, the term of this patent is extended or adjusted under 35 U.S.C. 154(b) by 0 days.

(21) Appl. No.: 16/810,463

(22) Filed: Mar. 5, 2020

(65) Prior Publication Data
US 2020/0255134 A1 Aug. 13, 2020

Related U.S. Application Data

(63) Continuation of application No. 14/835,243, filed on Aug. 25, 2015, now Pat. No. 10,618,645.

(51) Int. Cl.
*B64C 27/605* (2006.01)
*B64C 39/02* (2006.01)
*B64C 13/50* (2006.01)

(52) U.S. Cl.
CPC ........... *B64C 27/605* (2013.01); *B64C 13/50* (2013.01); *B64C 39/024* (2013.01); *B64C 2201/024* (2013.01)

(58) Field of Classification Search
CPC . B64C 27/605; B64C 2201/024; B64C 13/50; B64C 2027/723; B64C 2027/7255; B64C 39/024
See application file for complete search history.

(56) References Cited

U.S. PATENT DOCUMENTS

| 4,741,672 A | 5/1988 | Breuner |
| 5,012,423 A * | 4/1991 | Osder ................. G05D 1/0077 244/17.13 |
| 5,224,664 A * | 7/1993 | Adams, Sr. ............. G05B 5/01 244/17.13 |

(Continued)

FOREIGN PATENT DOCUMENTS

| AU | 2016311443 B2 | 11/2019 |
| CN | 101421157 A | 4/2009 |

(Continued)

OTHER PUBLICATIONS

English Machine Translation of CN2014223182U (Year: 2015).*

(Continued)

*Primary Examiner* — Dominick L Plakkoottam
*Assistant Examiner* — Paul W Thiede
(74) *Attorney, Agent, or Firm* — Dorsey & Whitney LLP (57) ABSTRACT

A ganged servo flight control system for an unmanned aerial vehicle is provided. The flight control system may include a swashplate having first, second, and third connection portions; a first control assembly connected to the first connection portion of the swashplate; a second control assembly connected to the second connection portion of the swashplate; and a third control assembly connected to the third connection portion of the swashplate. The first control assembly may include two or more servo-actuators connected to operate in cooperation with each other.

18 Claims, 10 Drawing Sheets

(56) References Cited

U.S. PATENT DOCUMENTS

| | | | | |
|---|---|---|---|---|
| 5,678,786 A * | 10/1997 | Osder | ................... | B64C 27/72 |
| | | | | 244/17.13 |
| 5,709,357 A * | 1/1998 | von Wilmowsky | .... | B64C 27/22 |
| | | | | 244/17.23 |
| 6,145,428 A * | 11/2000 | Gold | ................... | F41G 9/002 |
| | | | | 244/17.13 |
| 8,070,091 B2 * | 12/2011 | Benson | ................ | B64C 27/605 |
| | | | | 244/17.25 |
| 9,022,314 B1 | 5/2015 | Van Der Westhuizen | | |
| 9,193,455 B2 * | 11/2015 | Cotton | ................... | B64C 27/57 |
| 9,669,923 B2 * | 6/2017 | Goette | ................. | B64C 27/605 |
| 10,618,645 B2 * | 4/2020 | Holly | ................... | B64C 39/024 |
| 2004/0160133 A1 | 8/2004 | Jinno et al. | | |
| 2006/0011777 A1 * | 1/2006 | Arlton | ................... | B64C 39/024 |
| | | | | 244/7 B |
| 2006/0266880 A1 | 11/2006 | Chen | | |
| 2007/0102588 A1 | 5/2007 | DuRant | | |
| 2008/0065278 A1 | 3/2008 | Shultz et al. | | |
| 2009/0242691 A1 | 10/2009 | Wittmer | | |
| 2010/0084517 A1 | 4/2010 | Benson et al. | | |
| 2010/0210169 A1 * | 8/2010 | Rohr | .................... | A63H 30/04 |
| | | | | 446/36 |
| 2011/0057071 A1 * | 3/2011 | Sahasrabudhe | ...... | G05D 1/0858 |
| | | | | 244/17.13 |
| 2011/0315806 A1 * | 12/2011 | Piasecki | ................ | B64D 17/80 |
| | | | | 244/2 |
| 2012/0072056 A1 * | 3/2012 | Hasan | ................... | B64C 13/507 |
| | | | | 701/3 |
| 2012/0205494 A1 * | 8/2012 | Taylor | .................... | B64C 13/10 |
| | | | | 244/223 |
| 2012/0231695 A1 * | 9/2012 | Tu | ........................... | A63H 27/12 |
| | | | | 446/36 |
| 2012/0282103 A1 | 11/2012 | Muren | | |
| 2013/0119187 A1 | 5/2013 | Germanetti | | |
| 2013/0195662 A1 | 8/2013 | Tu | | |
| 2013/0209252 A1 | 8/2013 | Dickman et al. | | |
| 2014/0110532 A1 | 4/2014 | Covington et al. | | |
| 2014/0271204 A1 | 9/2014 | Shundo et al. | | |
| 2014/0377068 A1 * | 12/2014 | Arnold | .................. | B64C 27/605 |
| | | | | 416/134 A |
| 2015/0041278 A1 | 2/2015 | Naubert et al. | | |
| 2015/0050148 A1 | 2/2015 | Goette et al. | | |
| 2015/0081102 A1 | 3/2015 | Kopp | | |
| 2015/0217865 A1 | 8/2015 | Spina et al. | | |
| 2015/0232177 A1 | 8/2015 | Cotton et al. | | |

FOREIGN PATENT DOCUMENTS

| | | | | |
|---|---|---|---|---|
| CN | 201490896 U | 5/2010 | | |
| CN | 102131702 A | 7/2011 | | |
| CN | 103085970 A | 5/2013 | | |
| CN | 204223182 U | 3/2015 | | |
| CN | 104590559 A | 5/2015 | | |
| CN | 204369862 U | 6/2015 | | |
| DE | 10001378 A1 * | 8/2000 | ............. | A63H 27/12 |
| DE | 102010025718 A1 | 1/2012 | | |
| EP | 1846291 B1 | 10/2007 | | |
| EP | 2626302 A1 | 8/2013 | | |
| TW | M287704 U | 2/2006 | | |
| WO | 2017035391 A1 | 3/2017 | | |

OTHER PUBLICATIONS

EPO, "Extended European Search Report", Application No. 16840151.1, dated Feb. 26, 2019, 8 pages.
IP Australia, "Examination Report", Application No. 2016311443, dated Nov. 8, 2018, 6 Pages.
PCT, "International Search Report and Written Opinion", Application No. PCT/US2016/048765, dated Dec. 28, 2016, 10 pages.
"Search Report issued by Chinese Patent Office dated Jan. 28, 2021, for Chinese Application No. 201680062321.1, 3 pages".

* cited by examiner

GANGED SERVO FLIGHT CONTROL SYSTEM FOR AN UNMANNED AERIAL VEHICLE

CROSS-REFERENCE TO RELATED APPLICATIONS

This application claims the benefit of priority pursuant to 35 U.S.C. § 120 of U.S. patent application Ser. No. 14/835,243 filed 25 Aug. 2015 entitled "Ganged servo flight control system for an unmanned aerial vehicle," which is hereby incorporated by reference herein in its entirety.

TECHNICAL FIELD

This invention relates generally to flight control systems, and more specifically to ganged servo flight control systems for an unmanned aerial vehicle.

BACKGROUND

Fly-by-wire flight control systems, such as those found in an unmanned aerial vehicle (UAV) (e.g., a helicopter), use servo-actuators to control flight components (e.g., a swashplate). For example, servo-actuators are connected to the swashplate to control the collective and cyclic pitch of the helicopter.

The design of such flight control systems presents a particular unique challenge. Specifically, the flight control systems must provide sufficient speed, torque output, and positioning resolution to obtain precise control of the UAV. On the other hand, the flight control systems must be simple, lightweight, and inexpensive. Traditionally, larger UAVs incorporate larger servo-actuators as torque demands increase. Larger servo-actuators, however, do not increase proportionally in cost with respect to scale in the current market and may have less desirable speed characteristics associated with their increased torque qualities. Furthermore, larger servo-actuators are typically manufactured in low quantity and with long lead times, both of which hinder the availability of larger UAVs in the marketplace.

The present disclosure generally provides ganged servo-actuator flight controls that offer improvements or an alternative to existing arrangements.

The information included in this Background section of the specification, including any references cited herein and any description or discussion thereof, is included for technical reference purposes only and is not to be regarded subject matter by which the scope of the invention as defined in the claims is to be bound.

BRIEF SUMMARY

The present disclosure generally provides a flight control system for a helicopter. In one embodiment, the flight control system may include a swashplate having first, second, and third connection portions; a first control assembly connected to the first connection portion of the swashplate; a second control assembly connected to the second connection portion of the swashplate; and a third control assembly connected to the third connection portion of the swashplate. The first control assembly may include two or more servo-actuators connected to operate in cooperation with each other.

Embodiments of the present disclosure may include an unmanned aerial vehicle. The unmanned aerial vehicle may include a drive system having a swashplate and a rotor assembly, and a control system operable to control the drive system. The control system may include a first servo assembly operable to control the drive system in a first manner, a second servo assembly operable to control the drive system in a second manner, and a third servo assembly operable to control the drive system in a third manner. Each of the first, second, and third servo assemblies may include a respective plurality of servo-actuators in ganged relationship to operate as a single servo-actuator.

Embodiments of the present disclosure may include a method of calibrating a ganged servo flight control system for a helicopter including two or more servo-actuators, each of the servo-actuators having a servo arm. The method may include calibrating a first of the servo-actuators to respond correctly with respect to one or more input signals, providing the first of the servo-actuators with a known input signal, providing a second of the servo-actuators with the known input signal, and adjusting a neutral servo position of the second of the servo-actuators such that the servo arms of the servo-actuators are parallel.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

The accompanying drawings, which are incorporated into and constitute a part of the specification, illustrate examples of the disclosure and, together with the general description above and the detailed description below, serve to explain the principles of these examples.

DETAILED DESCRIPTION

The present disclosure generally provides a ganged servo flight control system for a UAV. The flight control system can be used in a variety of applications, for example, controlling a main rotor of a helicopter UAV, or the like. The flight control system integrates ganged servo-actuators to control the flight of the UAV in at least one direction. The ganged servo-actuators function to increase torque output of the servo assembly by operating as a single servo-actuator. Through use of ganged servo-actuators, significant servo speed improvements can be achieved over larger single servo-actuators with similar torque characteristics. Moreover, the ganged servo-actuators introduce redundancy of servo-actuators at the swashplate, which is a common failure mode for small, fly-by-wire helicopter UAV applications. To decrease the complexity of controlling the ganged servo-actuators, the ganged servo-actuators operate from a single drive signal. Thus, according to the present disclosure, the ganged servo-actuators provide the high speed, high torque, and high precision required for accurate control of the UAV.

Figure 1:
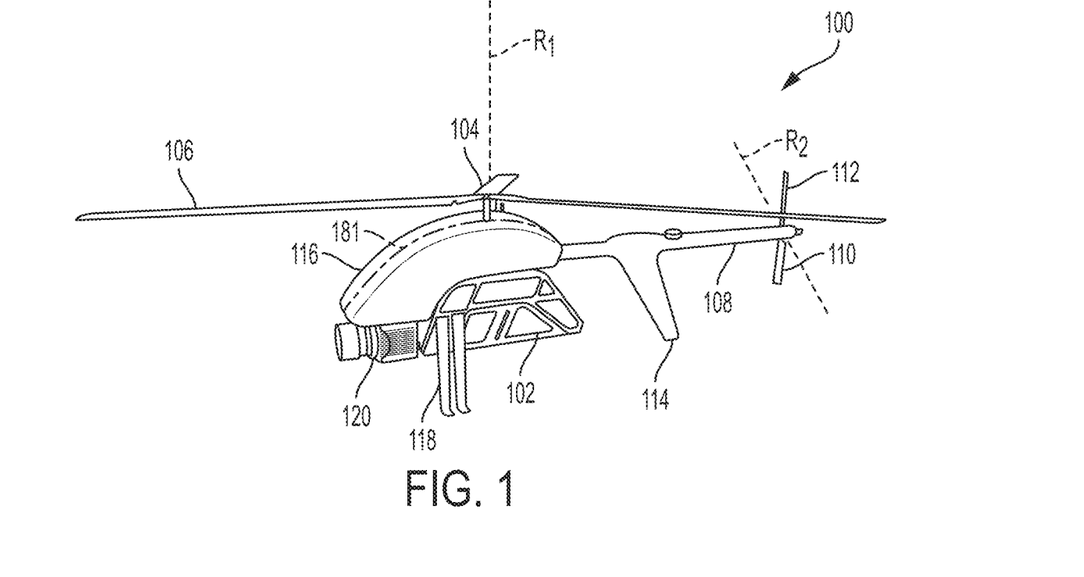
FIG. 1 is a top, front isometric view of a helicopter UAV incorporating a ganged servo flight control system in accordance with an embodiment of the present disclosure.

Referring now to FIG. 1, a helicopter UAV 100 generally includes a frame structure 102 to which a main rotor assembly 104 having a plurality of main rotor blades 106 (e.g., three main rotor blades) is rotatably attached at a first rotational axis $R_1$. A tail boom 108 is connected to the frame structure 102 to locate a tail rotor assembly 110 having a plurality of tail rotor blades 112 (e.g., two tail rotor blades) a distance away from the first rotational axis $R_1$ of the main rotor assembly 104. For example, the tail boom 108 includes a proximal end and a distal end. The proximal end of the tail boom 108 is connected to a rear portion of the frame structure 102 and the tail rotor assembly 110 is rotatably attached to the distal end of the tail boom 108 at a second rotational axis $R_2$, which may be orthogonally positioned relative to the first rotational axis $R_1$. As shown in FIG. 1, the main rotor assembly 104 is horizontally-mounted to the UAV 100 to provide vertical lift upon rotation of the main rotor assembly 104 about the first rotational axis $R_1$. The tail rotor assembly 110 is vertically-mounted to the distal end of the tail boom 108 to provide horizontal thrust upon rotation of the tail rotor assembly 110 about the second rotational axis $R_2$. The horizontal thrust provided by the tail rotor assembly 110 controls the rotational position (i.e., yaw) of the UAV 100 by, for example, counteracting the torque created by rotation of the main rotor assembly 104. The tail boom 108 may include a vertical stabilizer 114 to prevent the tail rotor assembly 110 from touching a support surface (e.g., the ground) during landing or ground operation of the UAV 100. In some embodiments, the vertical stabilizer 114 may support the UAV 100 against the support surface during non-flight operation and/or storage. Additionally or alternatively, the vertical stabilizer 114 may help or otherwise allow the UAV 100 to "weathervane" into the direction of motion during flight.

With continued reference to FIG. 1, the UAV 100 may include additional components to improve the functionality and capabilities of the UAV 100. For example, the UAV 100 may include a canopy 116 attached to the frame structure 102 to improve both the aesthetic and aerodynamic characteristics of the UAV 100. In an exemplary embodiment, the canopy 116 hides or otherwise conceals the internal components of the UAV 100. To aid in landing, the UAV 100 may include landing gear to support the UAV 100 during non-flight operation or storage. The landing gear, which may include planar or tubular landing skids 118, is attached to the frame structure 102 (e.g., to opposing sides of the frame structure 102). During non-flight operation or storage, the landing skids 118 may be the only portion of the UAV 100 touching the support surface, or alternatively support the UAV 100 in a tripod-like manner with the vertical stabilizer 114. The UAV 100 may also include accessory equipment 120 attached to the UAV 100 (e.g., to a front portion of the frame structure 102 and below the canopy 116) to provide numerous aviation uses, including, for example, aerial surveillance, inspection, surveying, 3D mapping, photography, and/or filmmaking. In such embodiments, the UAV 100 may be equipped with a flashlight, a Nadir mounted DSLR high resolution camera, and/or a fully stabilized camera gimbal having electro-optical and/or infrared sensors. The examples given above, however, are not limiting, and it is contemplated that substantially any type of accessory may be attached to the frame structure 102.

In some embodiments, the UAV 100 may be equipped with positioning and communication equipment. For example, the UAV 100 may be controlled by a hand-held remote control unit or ground station. In other embodiments, the UAV 100 may include an automatic flight control system capable of precise navigation, guidance, and control of the UAV. In such embodiments, the automatic flight control system may include an embedded computer system, a global positioning satellite (GPS) receiver, an inertial measurement unit, a barometer, a magnetometer, and/or absolute and differential pressure sensors. The UAV 100 may transfer data to, or receive data from, a user, a ground station, and/or other UAVs through Wi-Fi, cellular data, mobile satellite communications, radio frequency, infrared or ultrasonic remote control devices, or any other wireless data communication mediums.

Referring to FIGS. 2-5, a plurality of frame members may connect together to form the frame structure 102 of the UAV 100. For example, the frame structure 102 may include a first frame member 122 connected to a second frame member 124 by a plurality of connection members 126. As shown, the first and second frame members 122, 124 are substantially identical to and horizontally spaced from each other and define a longitudinal length of the frame structure 102. Each of the plurality of connection members 126 includes a base portion 128 having tabs 130 perpendicularly extending from opposing ends of the base portion 128. Each tab 130 is attached to an interior surface of one of the first and second frame members 122, 124 (e.g., adjacent bottom portions of the first and second frame members 122, 124). Once connected to the first and second frame members 122, 124, the connection members 126 define a transverse width of the frame structure 102. As shown, the frame structure 102 defines an internal cavity 132 operable to receive portions of a flight control assembly 134, as explained below.

Figure 2:
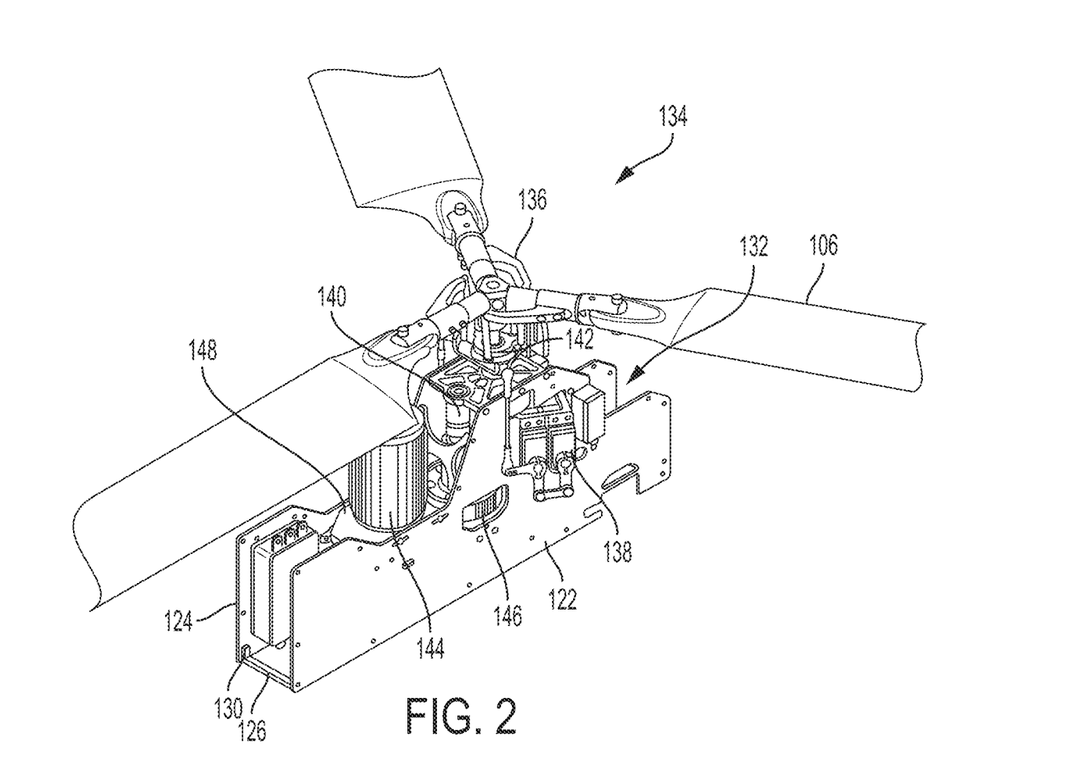
FIG. 2 is a fragmentary top, front isometric view of a flight control assembly in accordance with an embodiment of the present disclosure.
Figure 3:
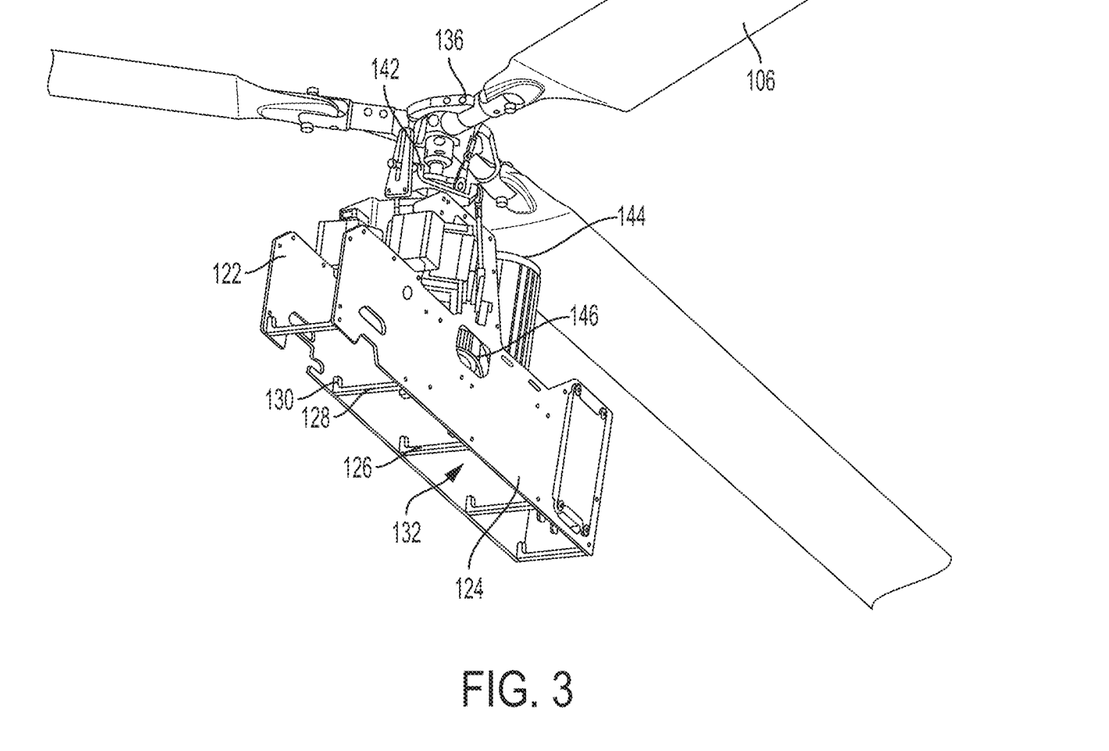
FIG. 3 is a fragmentary bottom, rear isometric view of the flight control assembly of FIG. 2 in accordance with an embodiment of the present disclosure.
Figure 4:
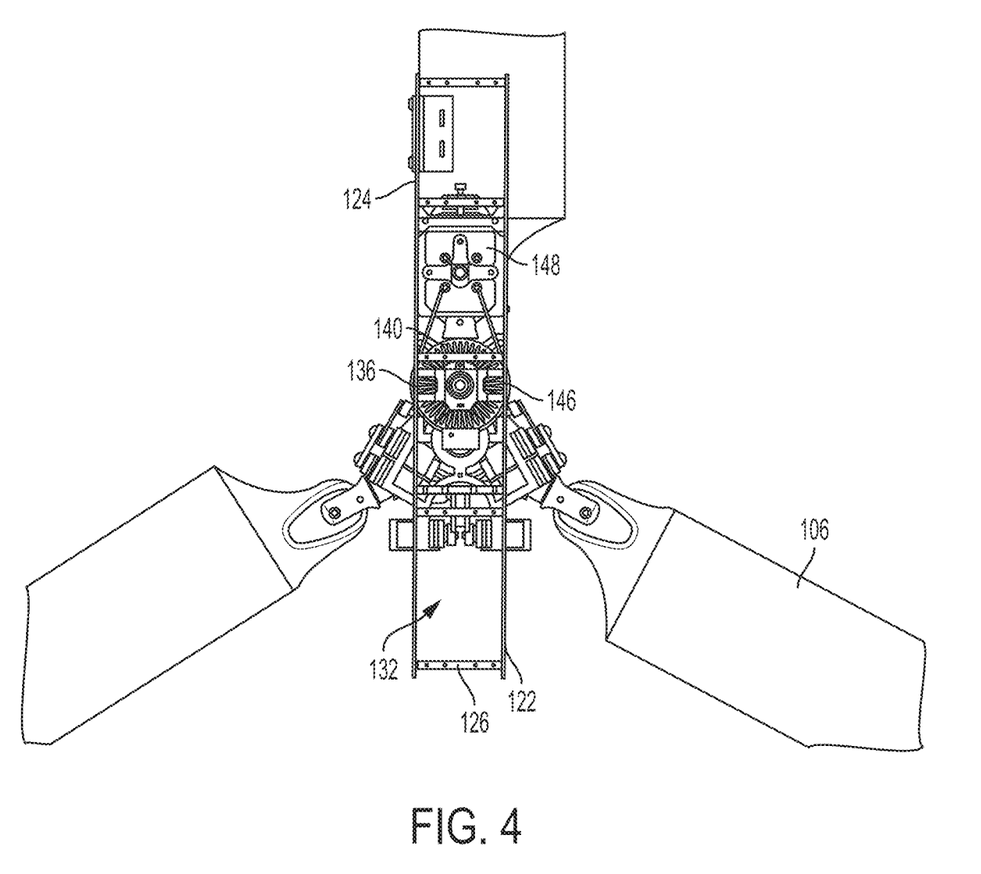
FIG. 4 is a fragmentary bottom plan view of the flight control assembly of FIG. 2 in accordance with an embodiment of the present disclosure.
Figure 5:
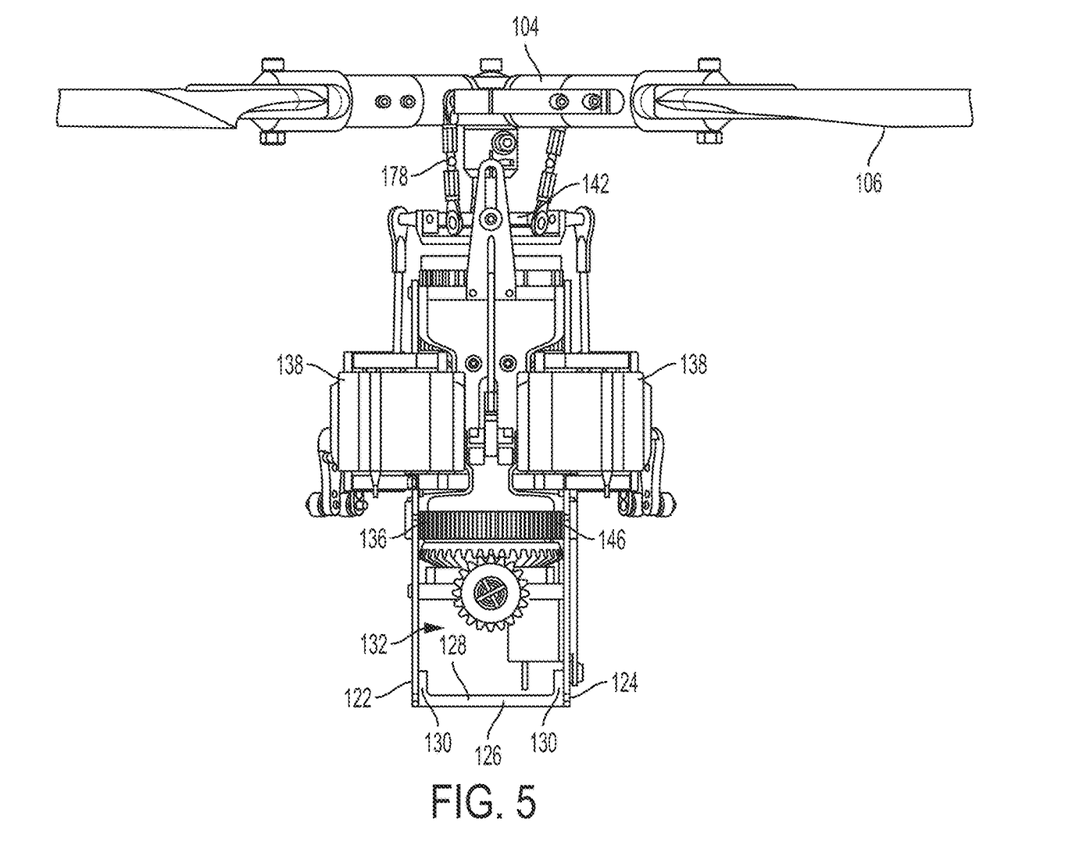
FIG. 5 is a fragmentary rear elevation view of the flight control assembly of FIG. 2 in accordance with an embodiment of the present disclosure.

In a general sense, the flight control assembly 134 of the UAV 100 includes a drive system 136 and a control system 138 operable to control the drive system 136 during flight operation. With continued reference to FIGS. 2-5, the drive system 136 includes a powertrain 140, the main rotor assembly 104, and a swashplate 142. The powertrain 140 includes a motor 144 (e.g., an electric motor) and a gearing assembly 146 to respectively generate power and deliver it to the main rotor assembly 104 and/or the tail rotor assembly 110. The gearing assembly 146, which converts and/or translates the rotation of the motor 144 into the rotation required to drive the main rotor assembly 104 and/or the tail rotor assembly 110, may include a set of meshingly engaged mechanical gearboxes and/or an electromagnetic transmission. Through the set of mechanical gearboxes and/or the electromagnetic transmission, the gearing assembly 146 directs the power generated by the motor 144 to both the main rotor assembly 104 and the tail rotor assembly 110. In some embodiments, however, the tail rotor assembly 110 may be driven by a secondary powertrain located substantially within the tail boom 108. As illustrated in FIGS. 2 and 4, the motor 144 is attached to a motor mount 148 positioned at least partially within the internal cavity 132 of the frame structure 102 and connected to the interior surfaces of both the first and second frame members 122, 124. In some embodiments, vibration from the motor 144 may be vibrationally isolated from the frame structure 102 by one or more vibration dampers operably associated with the motor mount 148.

In embodiments wherein the motor 144 is an electric motor, the UAV 100 includes a power source (e.g., a battery pack) to power the motor 144 during flight operation. The power source may be rechargeable through connection with DC and/or AC voltage sources. Additionally or alternatively, the power source may recharge through one or more solar panels connected to the UAV 100. As illustrated in FIGS. 2-5, portions of the drive system 136 is received within the internal cavity 132 of the frame structure 102 to conserve space and protect the individual components of the drive system 136. For example, the gearing assembly 146 and the power source are positioned within the internal cavity 132. Although the figures illustrate the motor 144 external to the internal cavity 132, it is contemplated that the motor 144 may also be received within the internal cavity 132 of the frame structure 102.

Figure 13:
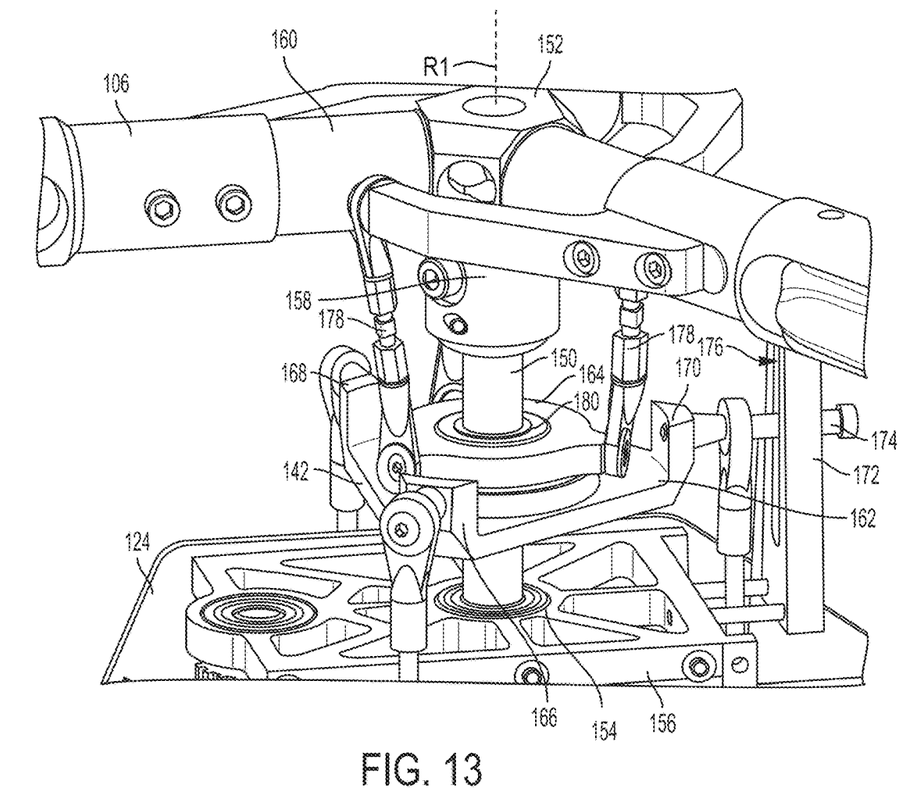
FIG. 13 is a fragmentary isometric view of a main rotor assembly in accordance with an embodiment of the present disclosure.

With reference to FIG. 13, the main rotor assembly 104 includes a mast 150, a hub 152 circumferentially attached to the mast 150, and the plurality of main rotor blades 106 (e.g., three main rotor blades) attached to the hub 152. The mast 150, which may be a cylindrical shaft that rotates about the first rotational axis $R_1$, extends upwards from, and is rotationally driven by, the gearing assembly 146. As best seen in FIG. 13, the mast 150 may be free to rotate through a bearing 154 held in place by a rigid support 156 connected to and between the interior surfaces of the first and second frame members 122, 124. As shown in FIG. 13, the hub 152 includes a first connection portion 158 and a second connection portion 160. The first connection portion 158 may be removably or fixedly attached to the top of the mast 150 by, for example, mechanical fasteners or other suitable fastening mechanisms. The main rotor blades 106 may be rotationally connected to the second connection portion 160 of the hub 152. In the exemplary embodiment shown in FIG. 13, the main rotor blades 106 connect to the second connection portion 160 perpendicularly to the first rotational axis $R_1$ such that the main rotor blades 106 reside and move within a common plane, although it is contemplated that the main rotor blades 106 may extend at an acute or an obtuse angle to the first rotational axis $R_1$. Each of the main rotor blades 106 have an airfoil-type cross-section to create lift as the main rotor blades 106 rotate about the first rotational axis $R_1$. Because the main rotor blades 106 are rotationally connected to the second connection portion 160, the rotational position of each main rotor blade (i.e., blade pitch) may be varied to control the amount of vertical lift and/or horizontal thrust applied to the UAV 100 by the main rotor assembly 104, as explained below.

With continued reference to FIG. 13, the swashplate 142 is connected to the drive system 136 to control the blade pitch of each of the main rotor blades 106. For example, the swashplate 142, which surrounds and at least partially rotates about the mast 150 of the main rotor assembly 104, operates to vary the blade pitch of the main rotor blades 106 cyclically throughout rotation of the main rotor assembly 104 about the first rotational axis $R_1$. Additionally, the swashplate 142 operates to vary the blade pitch of all the main rotor blades 106 collectively at the same time. As explained below, these blade pitch variations (i.e., cyclic and collective pitch controls) are controlled by manipulating (e.g., tilting, raising, or lowering) the swashplate 142 with the control system 138. As illustrated for example in FIG. 13, the swashplate 142 includes a non-rotating plate 162 and a rotary disc 164 that resides and moves within a plane parallel to the non-rotating plate 162. The non-rotating plate 162 is connected to and manipulated by the control system 138. For example, the non-rotating plate 162 may include first, second, and third connection portions 166, 168, 170 through which the control system 138 may manipulate the swashplate 142, as explained below. In some embodiments, the first, second, and third connection portions 166, 168, 170 may be offset from one another by 120 degrees. The non-rotating plate 162 is rotationally constrained by an anti-rotation bracket 172 attached to the rigid support 156 (e.g., a rear side of the rigid support 156). In such embodiments, the third connection portion 170 includes an anti-rotation boss 174 that is horizontally constrained within a vertical slot 176 defined in the anti-rotation plate. The rotary disc 164 rotates with the mast 150 relative to the non-rotating plate 162 and is connected to each of the main rotor blades 106 through pitch links 178. For purposes explained below, the non-rotating plate 162 and the rotary disc 164 may each include a bearing 180 that allows the respective non-rotating plate 162 and the rotary disc 164 to tilt relative to the mast 150 and/or the hub 152. As explained below, the swashplate 142 may tilt and vertically shift along the mast 150 to control the blade pitch of the main rotor blades 106 through the pitch links 178.

Figure 6:
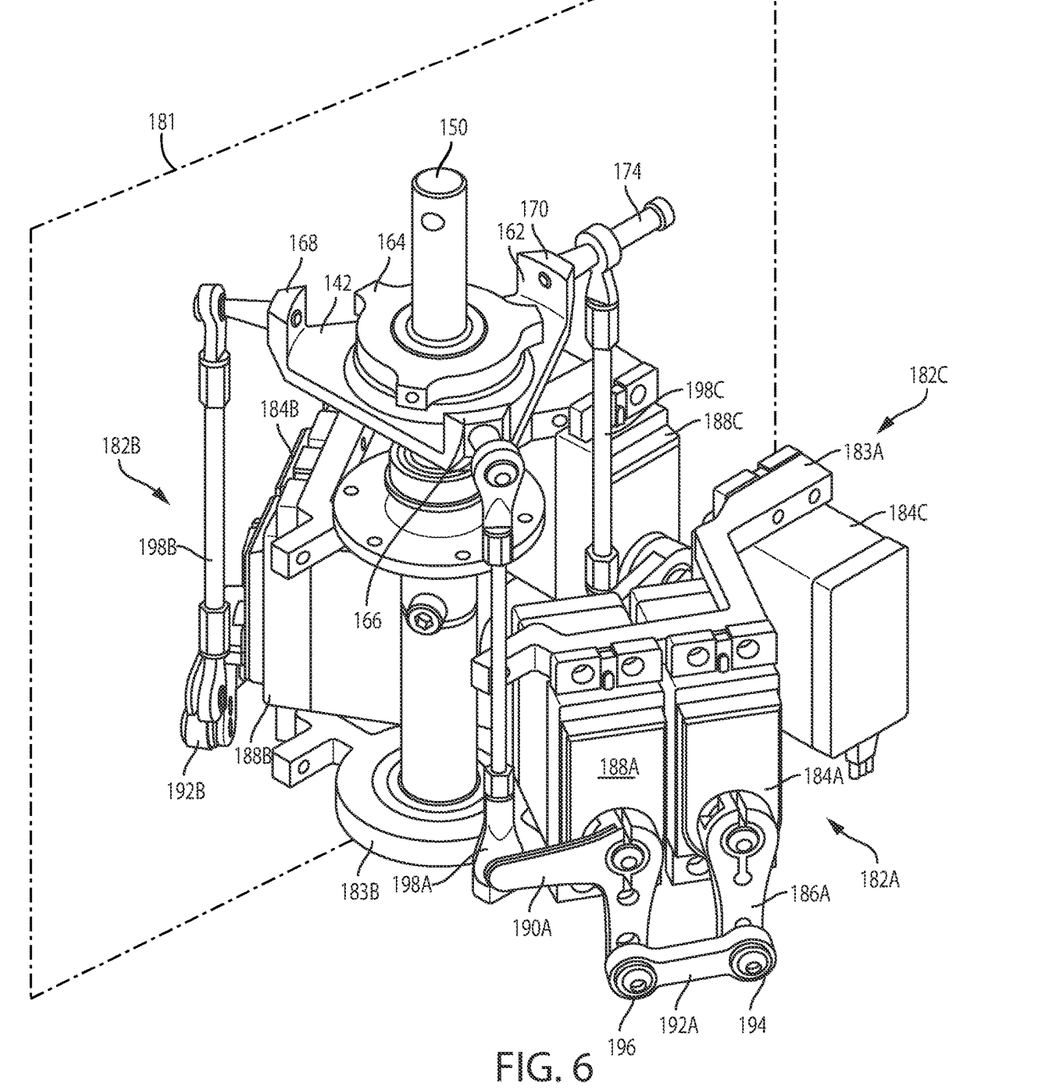
FIG. 6 is an isometric view of a ganged servo control system in accordance with an embodiment of the present disclosure.

To cyclically and collectively control the main rotor assembly 104, the control system 138 includes a plurality of control assemblies 182 operable to control the drive system 136. Referring to FIG. 6, each of the plurality of control assemblies, which may be referred to individually as respective servo assemblies, includes a respective plurality of servo-actuators 184, 188 connected to operate in cooperation with each other. For example, the servo-actuators of each control assembly are connected in ganged relationship to effectively operate as a single servo-actuator. The ganged servo relationship operates to increase the torque output of the control assembly without resorting to disproportionally larger and more expensive single servo-actuators. Thus, the solution cost may be intrinsically linearly proportional to the size (torque) required for a particular application. The ganged servo relationship may also provide significant servo speed improvements over a single larger servo-actuator with similar torque characteristics. More importantly, the ganged servo relationship of each control assembly provides a redundancy of servo-actuators at each connection portion of the swashplate 142, which is a common failure mode for small, fly-by-wire, helicopter applications. Should one of the servo-actuators of the ganged servo assembly fail, a second servo-actuator may provide the required control of the swashplate 142

Figure 7:
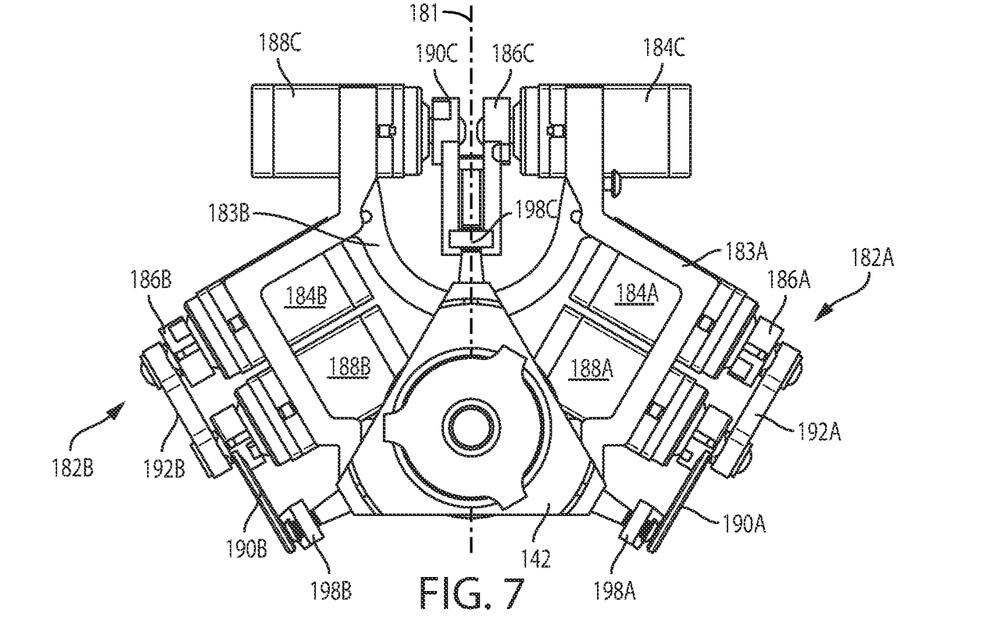
FIG. 7 is a top plan view of the ganged servo control system of FIG. 6 in accordance with an embodiment of the present disclosure.
Figure 8:
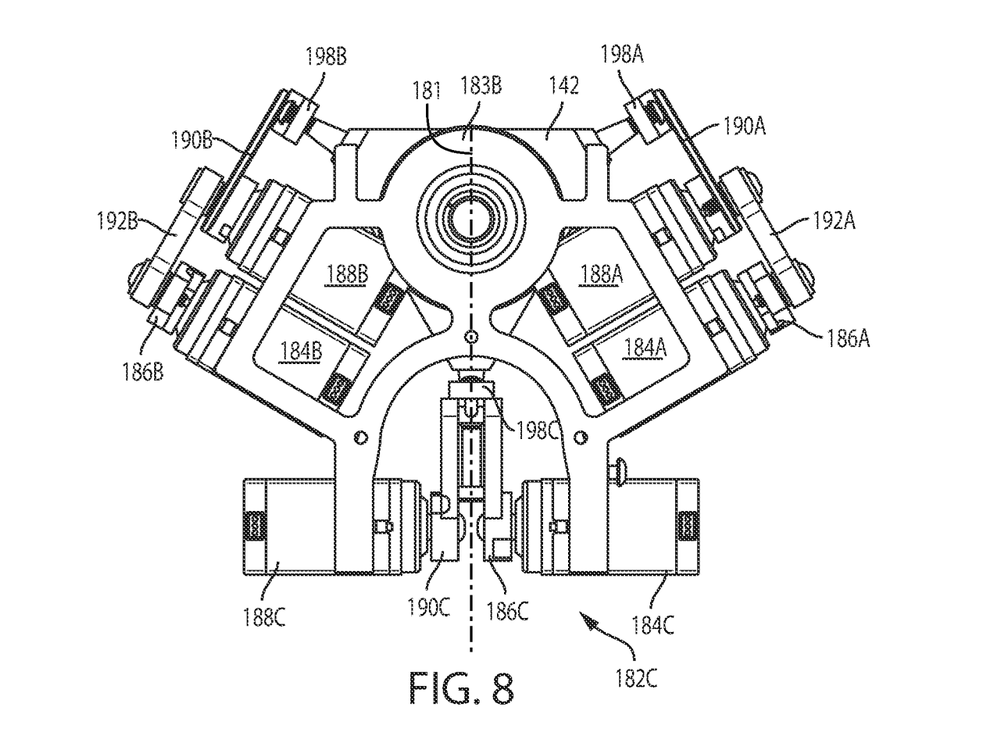
FIG. 8 is a bottom plan view of the ganged servo control system of FIG. 6 in accordance with an embodiment of the present disclosure.
Figure 9:
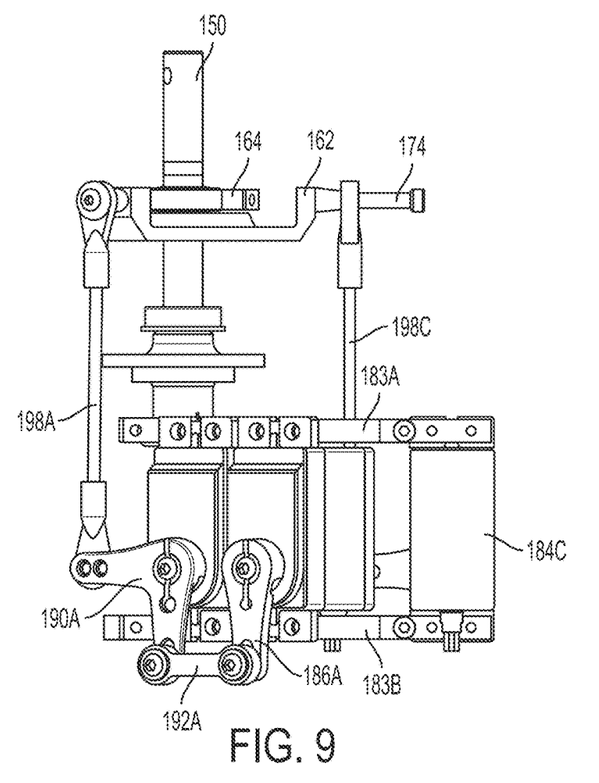
FIG. 9 is a right side elevation view of the ganged servo control system of FIG. 6 in accordance with an embodiment of the present disclosure.
Figure 10:
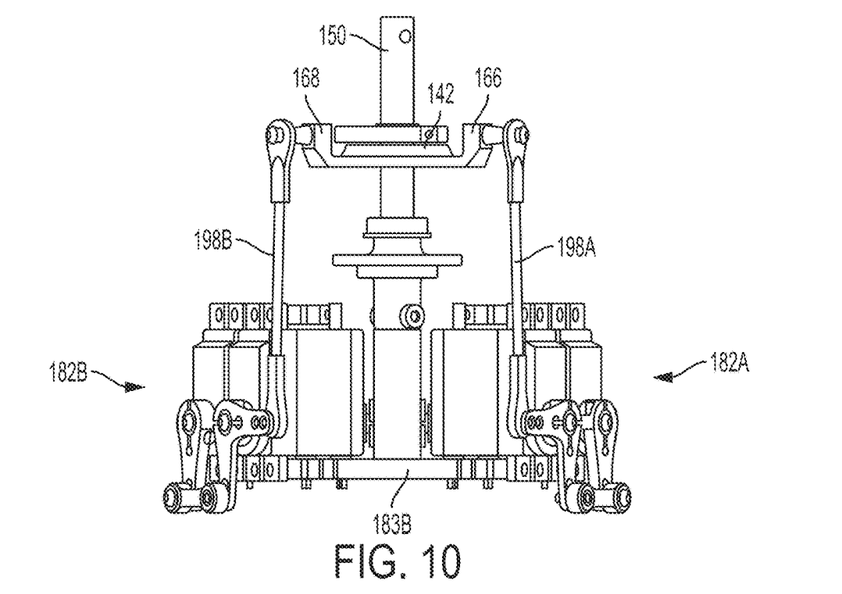
FIG. 10 is a front elevation view of the ganged servo control system of FIG. 6 in accordance with an embodiment of the present disclosure.
Figure 11:
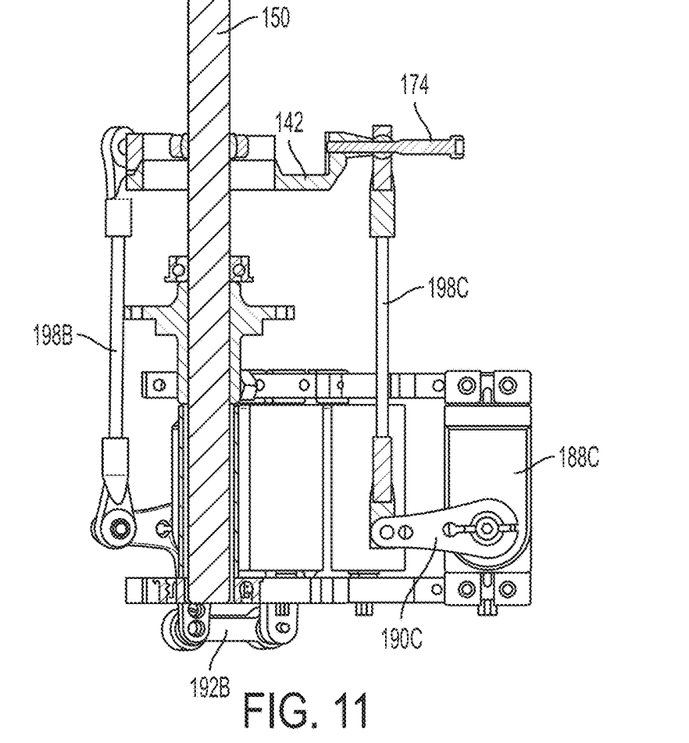
FIG. 11 is a cross-sectional view of the ganged servo control system of FIG. 6 taken along line 11-11 of FIG. 6 in accordance with an embodiment of the present disclosure.
Figure 12:
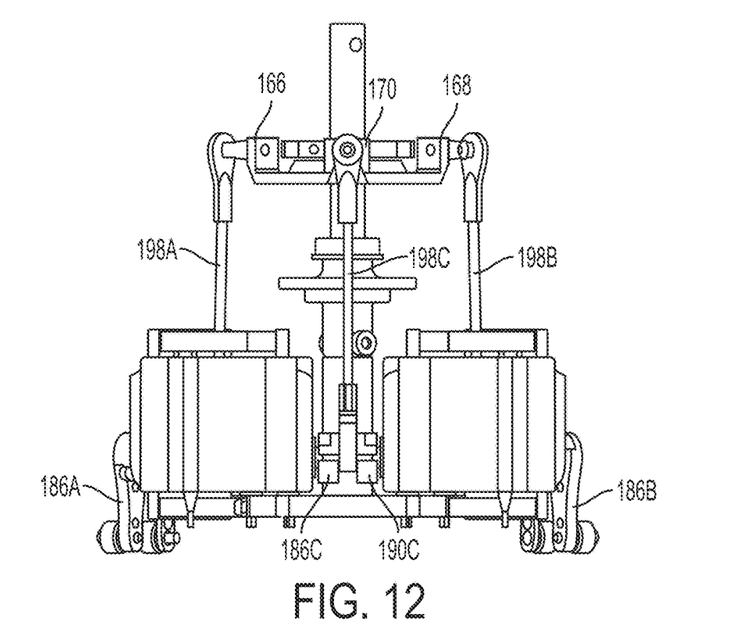
FIG. 12 is a rear elevation view of the ganged servo control system of FIG. 6 in accordance with an embodiment of the present disclosure.

With continued reference to FIG. 6, the control system 138 may include a first control assembly 182A operable to control the drive system 136 in a first manner, a second control assembly 182B operable to control the drive system 136 in a second manner, and a third control assembly 182C operable to control the drive system 136 in a third manner. In an exemplary embodiment, the first control assembly 182A (or first servo assembly) is connected to the first connection portion 166 of the swashplate 142, the second control assembly 182B (or second servo assembly) is connected to the second connection portion 168 of the swashplate 142, and the third control assembly 182C (or third servo assembly) is connected to the third connection portion 170 of the swashplate 142. As illustrated in FIGS. 6-8, the first, second, and third control assemblies 182A, 182B, 182C may be positioned relative to each other by attachment to an upper frame 183A and a lower frame 183B. Each of the upper and lower frames 183A, 183B may be positioned at least partially within the internal cavity 132 of the frame structure 102 and attached to the first and second frame members 122, 124 (e.g. to the interior surfaces of the first and second frame members 122, 124) to secure the control system to the UAV 100. In some embodiments, the upper and lower frames 183A, 183B may rotationally receive the mast 150 (see FIG. 6).

Referring to FIG. 6, the first control assembly 182A includes a first servo-actuator 184A having a first servo arm 186A, and a second servo-actuator 188A having a second servo arm 190A. Each of the first and second servo arms 186A, 190A are rotatably connected to the first and second servo-actuators 184A, 188A, respectively. As illustrated, the first and second servo-actuators 184A, 188A of the first control assembly 182A are horizontally stacked or arranged side-by-side such that the first servo arm 186A and the second servo arm 190A reside and move within a first common plane. A linkage member 192A connects the second servo arm 190A to the first servo arm 186A. The linkage member 192A may be a rigid member pivotably attached to each of and between the first servo arm 186A and the second servo arm 190A. For example, the linkage member 192A may be an elongate member having opposing first and second ends 194, 196. As shown in FIG. 6, for instance, the first end 194 may be pivotally connected to the first servo arm 186A (e.g., an end of the first servo arm 186A), and the second end 196 may be pivotably connected to the second servo arm 190A (e.g., an end of the second servo arm 190A). In some embodiments, the linkage member 192A may be a shaft about which each of the first servo arm 186A and the second servo arm 190A rotates. The first control assembly 182A may also include a linkage assembly 198A connected to the second servo arm 190A and to the first connection portion 166 of the swashplate 142; however, in some embodiments, the second servo arm 190A may be connected directly to the first connection portion 166. To control the swashplate 142, the first servo arm 186A and the second servo arm 190A rotate in unison to move (e.g., raise or lower) the first connection portion 166, as explained below.

With reference to FIGS. 6-8, the second control assembly 182B may be configured similar to the first control assembly 182A. Namely, the second control assembly 182B may include a first servo-actuator 184B and a second servo-actuator 188B horizontally stacked or arranged side-by-side such that associated first and second servo arms 186B, 190B reside and move within a second common plane. The second control assembly 182B may include a linkage member 192B configured similar to the linkage member 192A of the first control assembly 182A. Similar to the first control assembly 182A, the second control assembly 182B may include a linkage assembly 198B connected to the second servo arm 190B and to the second connection portion 168 of the swashplate 142. Like the first control assembly 182A, the first and second servo arms 186B, 190B of the second control assembly 182B rotate in unison to move (e.g., raise or lower) the second connection portion 168 of the swashplate 142, as explained below.

With continued reference to FIGS. 6-8, the third control assembly 182C includes a first servo-actuator 184C having a first servo arm 186C, and a second servo-actuator 188C arranged opposite the first servo-actuator 184C and having a second servo arm 190C. In some embodiments, the first servo arm 186C and the second servo arm 190C are mirror images of each other. As illustrated, the first and second servo-actuators of the third control assembly 182C are arranged opposite each other in facing relationship such that the first servo arm 186C and the second servo arm 190C reside and move within parallel planes. In some embodiments, the first and second servo-actuators of the third control assembly 182C may be positioned in facing relationship with each other across a vertical midline 181 of the UAV 100. In some embodiments, the third control assembly 182C may include a linkage assembly connected to the first and second servo arms 186C, 190C and to the third connection portion 170 of the swashplate 142. For example, the linkage assembly of the third control assembly 182C may be positioned at least partially between the first and second servo arms 186C, 190C. Like the servo arms 186A, 186B, 190A, 190B of the first and second control assemblies 182A, 182B, the first and second servo arms 186C, 190C of the third control assembly 182C rotate in unison to move (e.g., raise or lower) the third connection portion 170 of the swashplate 142, as explained below.

As noted above, the first, second, and third control assemblies 182A, 182B, 182C manipulate the swashplate 142 to control the cyclic and collective pitch of the main rotor blades 106. To control the collective pitch of the main rotor blades 106, each of the first, second, and third control assemblies 182A, 182B, 182C vertically shift (e.g., raise or lower) the swashplate 142 relative to the hub 152 of the main rotor assembly 104. For example, the servo-actuators 184, 188 of the first, second, and third control assemblies 182A, 182B, 182C rotate the respective servo arms 186, 190 to raise or lower the respective linkage assemblies 198 equally to collectively raise or lower the swashplate 142 along the mast 150. As the swashplate 142 collectively moves towards the hub 152, each of the pitch links 178 may cause an associated main rotor blade 106 to equally rotate in a first rotational direction at the second connection portion 160 of the hub 152. Similarly, as the swashplate 142 collectively moves away from the hub 152, each of the pitch links 178 may cause an associated main rotor blade 106 to equally rotate in a second rotational direction opposite the first rotational direction. In this manner, the blade pitch is increased or decreased by the same amount and at the same time on all main rotor blades 106, thereby increasing or decreasing the total lift derived from the main rotor assembly 104.

To control the cyclic pitch of the main rotor blades 106, at least one of the first, second, and third control assemblies 182A, 182B, 182C tilts the swashplate 142 relative to the hub 152. Tilting of the swashplate 142 relative to the hub 152 changes the blade pitch of the main rotor blades 106 cyclically depending on the position of the main rotor blades 106 as they rotate about the first rotational axis $R_1$ such that each of the main rotor blades 106 has the same blade pitch at the same point in a revolutionary cycle. In this manner, the lift generated by each of the main rotor blades 106 changes as the blade rotates through a revolutionary cycle, thereby causing the UAV 100 to pitch or roll depending on the relative positions of the first, second, and third connection portions 166, 168, 170 of the swashplate 142. For example, raising or lowering the third connection portion 170 relative to at least one of the first and second connection portions 166, 168 causes the UAV 100 to pitch forward or aft, respectively. Similarly, raising or lowering one of the first and second connection portions 166, 168 relative to the other of the first and second connection portions 166, 168 causes the UAV 100 to roll left or right.

Figure 14:
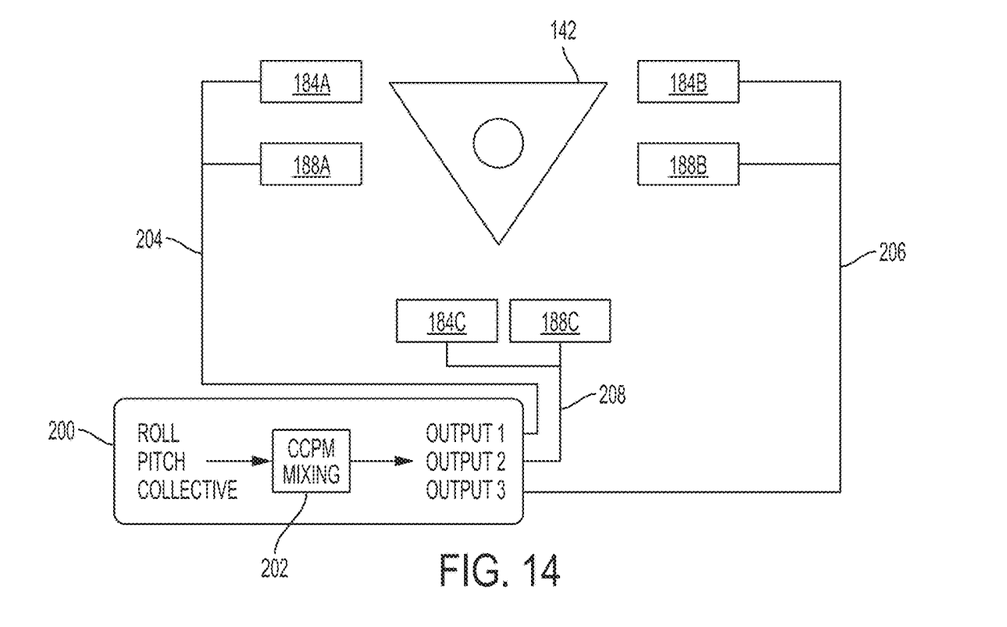
FIG. 14 is wiring diagram for a ganged servo flight control system in accordance with an embodiment of the present disclosure.

To decrease the complexity of controlling the ganged servo-actuators 184, 188, the ganged servo-actuators 184, 188 of each control assembly 182 may operate from a single drive signal. For example, with reference to FIG. 14, a servo output signal generator 200, whether incorporated into the UAV 100 or part of a ground control system, provides a plurality of outputs (e.g., three outputs) for the first, second, and third control assemblies 182A, 182B, 182C. In the exemplary embodiment shown in FIG. 14, the servo output signal generator 200 includes cyclic/collective pitch mixing (CCPM) software 202 to mix the individual control inputs for roll, pitch, and collective to control the swashplate 142. As shown, the first and second servo-actuators of the first control assembly 182A are connected to a first signal output 204, the first and second servo-actuators of the second control assembly 182B are connected to a second signal output 206, and the first and second servo-actuators of the third control assembly 182C are connected to a third signal output 208. In this manner, each of the servo-actuators 184, 188 of each control assembly 182 operate as a single servo-actuator.

Figure 15:
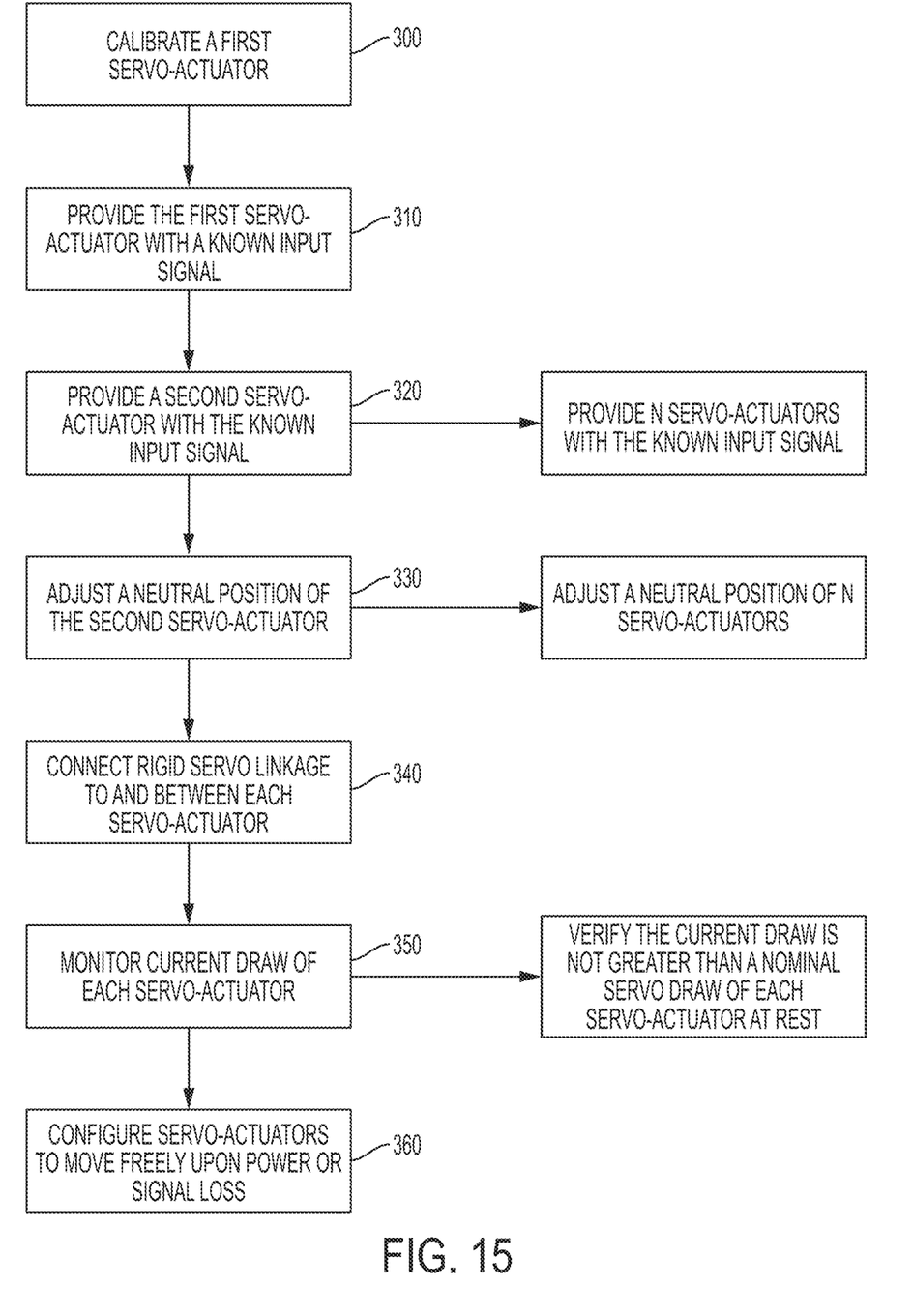
FIG. 15 is a flowchart of a process of calibrating a ganged servo flight control system in accordance with an embodiment of the present disclosure.

Because the servo-actuators 184, 188 of each control assembly 182 are rigidly connected by the linkage member 192, it is desirable to calibrate the ganged servo control system 138 such that the servo-actuators 184, 188 of each control assembly 182 operate in unison. One method to calibrate the control system 138 is shown in FIG. 15. At step 300, the first servo-actuator 184 is calibrated to respond correctly with respect to one or more input signals. At step 310, the first servo-actuator 184 is provided with a known input signal. At step 320, the second servo-actuator 188 is provided with the known input signal. In some embodiments, step 320 includes providing the known input signal to N number of servo-actuators. At step 330, a neutral servo position of the second servo-actuator 188 is adjusted such that the servo arms 186, 190 of the first and second servo-actuators 184, 188 are parallel. For example, should the servo arms 186, 190 of the first and second servo-actuators 184, 188 not be parallel to each other once the known signal is provided to each servo-actuator 184, 188, the servo arms 186, 190 of at least one of the servo-actuators 184, 188 may be removed and reattached such that servo arms 186, 190 are parallel. In some embodiments, step 330 may include adjusting a neutral position of N number of servo-actuators.

With continued reference to FIG. 15, in some embodiments, the method may include steps 340, 350, and 360. At step 340, a rigid servo linkage (e.g., the linkage member 190) is connected to and between the servo arms 186, 190 of the first and second servo-actuators 184, 188. During step 340, the rigid servo linkage should be connected without binding of the first and second servo-actuators 184, 188. At step 350, a current draw of each servo-actuator 184, 188 is monitored. In some embodiments, step 350 may include verifying that the current draw of each servo-actuator 184, 188 is not greater than a nominal servo draw of each of the servo-actuators 184, 188 at rest. At step 360, the first and second servo-actuators 184, 188 are configured to move freely upon power or signal loss. Should one of the ganged servo-actuators 184, 188 fail during operation, the remaining servo-actuator(s) 184, 188 may continue to provide the desired control of the swashplate 142 and/or the UAV 100, as noted above. The above steps are not exhaustive, and the ganged servo control system 138 may be calibrated using additional steps. Moreover, any number of the above steps, whether in or out of the sequence outlined above, may be used to calibrate the ganged servo control system 138.

The foregoing description has broad application. Accordingly, the discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., distal, upper, lower, upward, left, right, lateral, front, back, top, bottom, outer, inner, below) are only used for identification purposes to aid the reader's understanding of the present disclosure and drawings and not as limitations. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., first, second, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A flight control system for a helicopter comprising
a swashplate having a third connection portion;
a third control assembly comprising:
a first servo-actuator having a first servo arm,
a second servo-actuator having a second servo arm, and
a linkage assembly connecting the second servo arm to the first servo arm forming a third output thereat such that the first servo-actuator and the second servo actuator rotate in unison to control the swashplate,
wherein:
the first servo-actuator and the second servo-actuator are arranged opposite each other in a facing relationship with each other across a vertical midline of the helicopter such that the first servo arm of the first servo-actuator and the second servo arm of the second servo-actuator reside and move within parallel planes, and
the linkage assembly being configured to move so as to directly move the third connection portion by the unified rotation of and by power of the first and the second servo-actuators.

2. The flight control system of claim 1, wherein the third connection portion includes an anti-rotation boss extending radially outwardly away from the swashplate and the linkage assembly is connected to the anti-rotation boss.

3. The flight control system of claim 2, wherein the first servo arm and the second servo arm are each connected to a first end of the linkage assembly.

4. The flight control system of claim 3, wherein a second end of the linkage assembly opposite the first end is connected to the anti-rotation boss of the third connection portion.

5. The flight control system of claim 2, wherein the first servo arm and the second servo arm are rigidly linked together by the linkage assembly.

6. The flight control system of claim 3, wherein the first end of the linkage assembly is disposed intermediate the first servo assembly and the second servo assembly.

7. The flight control system of claim 1, wherein
the swashplate includes a second connection portion; and
the flight control system further comprises a second control assembly including two or more servo-actuators connected to rotate in unison, wherein the second control assembly has a second output comprising one of two or more servo- actuators mechanically connected to a second connection portion of the swashplate to directly move the second connection portion by the unified rotation of and by power of the two or more servo-actuators of the second control assembly.

8. The flight control system of claim 7, wherein the two or more servo-actuators of the second control assembly are arranged side-by-side such that the first servo arm and the second servo arm reside and move within a common plane.

9. The flight control system of claim 7, wherein
the swashplate includes a first connection portion; and
the flight control system further comprises a first control assembly including two or more servo-actuators connected to rotate in unison, wherein the first control assembly has a first output comprising one of the two or more servo-actuators mechanically connected to a first connection portion of the swashplate to directly move the first connection portion by the unified rotation of and by power of the two or more servo-actuators of the first control assembly.

10. The flight control system of claim 9, wherein the unified rotation of the two or more servo actuators of the second control assembly moves the second connection portion.

11. The flight control system of claim 10, wherein the unified rotation of the two or more servo-actuators of the first control assembly moves the first connection portion.

12. The flight control system of claim 11, wherein
the second output of the second control assembly is connected to the second connection portion by a second linkage assembly, and
the first output of the first control assembly is connected to the first connection portion by a first linkage assembly.

13. The flight control system of claim 12, wherein the second control assembly comprises
a first servo-actuator of the second control assembly having a first servo arm;
a second servo-actuator of the second control assembly having a second servo arm; and
a linkage member connecting the second servo arm of the second actuator of the second control assembly to the first-servo arm of the first actuator of the second control assembly.

14. The flight control system of claim 13, wherein the first control assembly comprises
a first servo-actuator of the first control assembly having a first servo arm;
a second servo-actuator of the first control assembly having a second servo arm; and
a linkage member connecting the second servo arm of the second actuator of the first control assembly to the first servo arm of the first actuator of the first control assembly.

15. An unmanned aerial vehicle, wherein the unmanned aerial vehicle is in a form of a helicopter comprising
a drive system having
a swashplate, and
a rotor assembly operably coupled to the swashplate; and
a control system operable to control the drive system, the control system including
a third servo assembly operable to control the drive system in a first manner, wherein the third servo assembly includes two or more servo-actuators arranged opposite each other in a facing relationship with each other across a vertical midline of the unmanned aerial vehicle, such that a first servo arm of the first servo-actuator and the second servo arm of the second servo-actuator reside and move within parallel planes, and connected to rotate in unison and the third servo assembly has a third output connected to a third connection portion of the swashplate to directly move the third connection portion by the unified rotation of and by power of the two or more servo-actuators.

16. The unmanned aerial vehicle of claim 15, wherein
the swashplate has a second connection portion; and
the control system further comprises a second servo assembly including two or more servo-actuators connected to rotate in unison and the second servo assembly has a second output comprising one of the two or more servo-actuators mechanically connected to a second connection portion of the swashplate to directly move the second connection portion by the second unified rotation of and by power of the two or more servo-actuators of the second servo assembly.

17. The flight control system of claim 16, wherein
the swashplate has a first connection portion;
the control system further comprises a first servo assembly including two or more servo-actuators connected to rotate in unison and the first servo assembly has a first output comprising the two or more servo-actuators mechanically connected to a first connection portion of the swashplate to directly move the first connection portion by the unified rotation of and by power of the two or more servo-actuators of the first servo assembly.

18. A flight control system for a helicopter comprising
a swashplate having a third connection portion having an anti-rotation boss;
a third control assembly controlling the swashplate and including two or more servo-actuators arranged opposite each other in a facing relationship with each other across a vertical midline of the helicopter and connected to rotate in unison, wherein the third control assembly has a first mechanical output comprising one of the two or more servo-actuators mechanically connected to the third connection portion of the swashplate to directly move the third connection portion by the unified rotation of and by power of the two or more servo-actuators, wherein the first servo-actuator and the second servo-actuator are arranged opposite each other such that a first servo arm of the first servo-actuator and the second servo arm of the second servo-actuator reside and move within parallel planes; and
an anti-rotation bracket fixed to a support and defining a vertical slot therein, wherein the anti-rotation boss extends outwardly away from the swashplate from the third connection portion and includes an end portion that passes through, and is constrained by, the vertical slot.

* * * * *